Patented Jan. 24, 1933

1,895,121

UNITED STATES PATENT OFFICE

ABRAHAM SIDNEY BEHRMAN, OF CHICAGO, ILLINOIS, ASSIGNOR TO GENERAL ZEOLITE COMPANY, OF CHICAGO, ILLINOIS, A CORPORATION OF ILLINOIS

ZEOLITE PREPARATION

No Drawing.     Application filed June 17, 1929. Serial No. 371,735.

This invention relates to porous gel-like materials and to methods of preparing the same.

It more particularly relates to the production of porous base exchange silicates or zeolites.

An object of this invention is to provide an improved base exchange silicate or zeolite Another object of this invention is to provide an improved process for preparing base exchange silicates or zeolites.

A further object of this invention is to provide improved methods of proportioning the reagents and of preparing the reaction mixtures for the production of base exchange silicates or zeolites.

A still further object of this invention is to provide a base exchange silicate gel of increased density and base exchange capacity per unit volume, and of greater hardness and durability.

Other objects will appear during the course of the following description.

The base exchange silicates of the present invention are most desirably prepared by reacting together a solution of amphoteric oxide or hydroxide, either alkaline or acid in character, and a solution of hydrated silica.

In accordance with my invention, the concentrations, proportions, temperatures and other conditions are so adjusted that a gel or jelly will be formed embracing all or the major portion of the constituents of the reaction mixture.

In the preferred embodiment of the present invention a solution of an alkali metal silicate or a colloidal solution of silicic acid is combined with a solution of aluminum sulphate or sodium aluminate in such proportions and with such additions of alkali or acid materials as to result in the production of a reaction mixture which will be slightly alkaline to methyl orange and similar indicators. The pH of the reaction mixture may vary from about 4.4 to 8.3 but it is most preferable to restrict this variation in pH from about 7.0 to 8.0.

As specific examples of the present invention, to which it is by no means restricted, the following typical reaction mixtures may be prepared. An alkali metal silicate such as sodium silicate or potassium silicate may be combined with a salt of an amphoteric metal such as aluminum sulphate, aluminum acetate, chromium sulphate, iron salts, and so forth. It is also possible to utilize alkaline reacting amphoteric metal compounds, such as sodium aluminate. Acids or acidic materials, such as sulphuric acid, acetic acid, carbon dioxide, or acid salts containing these materials, may also be utilized either to regulate the hydrogen ion concentration of the reaction mixture or to produce additional quantities of soluble salts therein. Alkalies or alkaline materials may also be utilized to increase the alkalinity or decrease the acidity of the mixture or to increase the amount of soluble salts present therein. Such alkalies or alkaline materials may be caustic soda, alkaline earth hydroxides, alkali metal, or alkaline earth, carbonates or bicarbonates, and other materials. As stated above, under certain circumstances a colloidal solution of silicic acid may be substituted for the alkali metal silicate solution. It is not necessary that all of the reagents set out above be used simultaneously. If it is desired to produce a base exchange silicate, it is necessary to utilize a compound containing an amphoteric metal and one containing silica, and the other ingredients may be partly or wholly omitted depending upon the exact result which it is desired to produce. Any desired sequence of intermixture of the ingredients may be employed and any reagent may be utilized at any time prior to the completion of the drying of the product. For example, when carbon dioxide is used as an acidic material, it may be conveniently introduced in the air used in the drying operation.

The moisture may be removed from the gel by drying, preferably with warm air or gases, at a temperature not over 100° C. In many cases the temperature is maintained at a much lower degree than 100° C., say about 50° C. Before the drying operation, part of the mother liquor may also be removed by exudation, drainage, pressing or other means.

The following are typical examples of the proportions which may be utilized. 100 gallons of a solution containing 1.95 lbs. per gallon of sodium silicate are mixed with 100 gallons of a solution containing 0.47 lbs. per gallon of aluminum sulphate. The sodium silicate is preferably of the usual 42° Bé. solution of commerce containing about 9.7% $Na_2O$ and 29.6% $SiO_2$. The aluminum sulphate is of the commercial variety known as filter alum and contains about 18% $Al_2O_3$ and 47% acid as $H_2SO_4$. The pH of the mixture is about 8.0.

As another example of this invention 100 gallons of a solution containing 2.46 lbs. per gallon of sodium silicate are mixed with 100 gallons of a solution containing per gallon 0.472 lbs. of aluminum sulphate and 0.063 lbs. of sulphuric acid. The sodium silicate and aluminum sulphate are preferably the same as used in the preceding example and the sulphuric acid is commercial 66° Bé. containing about 93.7 $H_2SO_4$, the pH of the resulting mixture is about 7.8.

As stated before, the zeolite forming reagents are mixed in such concentrations or proportions and under such other conditions as to give rise to a gel embracing substantially all or a major part of the reaction mixture, and a pH value in a reaction mixture varying between 4.4 and 8.3. I have found that by mixing the reagent in such proportions as to form a solid gel within the range of pH values given several advantages are obtained. For example, the gel may be dried in the absence of previous washing without incurring injury to the gel structure such as occurs from higher degrees of alkalinity. Thus, the base exchange silicates so produced are of greater hardness and durability and more resistant to attrition and to disintegration into fine particles. They also possess a greater density than base exchange silicates prepared in a reaction mixture of high pH ranges. The density of the latter range from about 25 to 40 lbs. per cubic foot, while the density of those prepared in accordance with the present invention range from 40 to 65 lbs. per cubic foot, the "bone-dry" weights being referred to in both cases. The silicates will also have a greater softening capacity per unit volume of zeolite. The greater density is distinctly advantageous from an engineering viewpoint since the material will stand higher upflow softening or backwash without danger of being carried away.

What is claimed is:

1. A method of producing zeolites which comprises interreacting a solution of an amphoteric metal hydroxide and a soluble silicate in such proportions as to produce a gel embracing the major portion of the reaction mixture and maintaining the reaction mixture at a pH of about 4.4 to 8.3 during the reaction.

2. A method of producing zeolites which comprises interreacting a solution of an amphoteric metal hydroxide, an acid and a soluble silicate in such proportions as to produce a gel embracing the major portion of the reaction mixture and maintaining the reaction mixture at a pH of about 4.4 to 8.3 during the reaction.

3. A method of producing zeolites which comprises combining a solution of aluminum hydroxide and an alkali metal silicate in such proportions as to produce a gel embracing substantially all of the reaction mixture and maintaining the reaction mixture at a pH of about 5.5 to 8.0 during the reaction.

4. A method of producing zeolites which comprises combining a solution of aluminum hydroxide, an acid, and an alkali metal silicate in such proportions as to produce a gel embracing substantially all of the reaction mixture and maintaining the reaction mixture at a pH of about 5.5 to 8.0 during the reaction.

5. A method of producing zeolites which comprises reacting aluminum sulphate and sodium silicate in aqueous solutions in such proportions as to produce a gel embracing substantially all of the reaction mixture and as to give the reaction mixture a pH of about 7.5 to 8.0.

6. A method of producing zeolites which comprises reacting aluminum sulphate, sulphuric acid and sodium silicate in aqueous solutions in such proportions as to produce a gel embracing substantially all of the reaction mixture and as to give the reaction mixture a pH of about 7.5 to 8.0.

In testimony whereof I have hereunto subscribed my name.

ABRAHAM SIDNEY BEHRMAN.